(12) United States Patent
Kwon et al.

(10) Patent No.: US 11,084,498 B2
(45) Date of Patent: Aug. 10, 2021

(54) APPARATUS AND METHOD FOR CONTROLLING DRIVING MODE OF VEHICLE

(71) Applicants: Hyundai Motor Company, Seoul (KR); Kia Motors Corporation, Seoul (KR)

(72) Inventors: Gi Young Kwon, Seoul (KR); Soo Bang Lee, Gyeonggi-do (KR); Kyoung Cheol Oh, Gyeonggi-do (KR); Hong Chul Shin, Gyeonggi-do (KR); Hye Kil Hwang, Gyeonggi-do (KR); Jong Bum Oh, Gyeonggi-Do (KR); Seul Gi Lee, Gyeonggi-do (KR); Jae Myoung Pi, Gyeonggi-do (KR); Sang Don Lee, Gyeonggi-do (KR); Woo Suk Choi, Gyeonggi-do (KR); Seong Ik Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 751 days.

(21) Appl. No.: 15/831,022

(22) Filed: Dec. 4, 2017

(65) Prior Publication Data
US 2019/0118830 A1 Apr. 25, 2019

(30) Foreign Application Priority Data

Oct. 25, 2017 (KR) ........................ 10-2017-0139499

(51) Int. Cl.
*B60W 50/10* (2012.01)
*B60W 30/182* (2020.01)
(Continued)

(52) U.S. Cl.
CPC ............ *B60W 50/10* (2013.01); *B60W 20/10* (2013.01); *B60W 30/182* (2013.01); *B60W 30/188* (2013.01); *Y10S 903/93* (2013.01)

(58) Field of Classification Search
CPC .. B60W 50/10; B60W 30/182; B60W 30/188; B60W 20/10; B60W 50/14;
(Continued)

(56) References Cited

U.S. PATENT DOCUMENTS 10,449,957 B2 * 10/2019 Nagy .................... B60W 40/09
2005/0140322 A1 * 6/2005 Itakura .................. B62D 6/007
318/466

(Continued)

FOREIGN PATENT DOCUMENTS

| JP | 2006-347531 A | 12/2006 |
|---|---|---|
| JP | 2013-203341 A | 10/2013 |
| JP | 6052343 B2 | 12/2016 |

*Primary Examiner* — Nadeem Odeh
(74) *Attorney, Agent, or Firm* — Mintz Levin Cohn Ferris Glovsky and Popeo, P.C.; Peter F. Corless

(57) ABSTRACT

An apparatus and a method for controlling a driving mode of a vehicle are provided. The apparatus includes a mode converter that converts the driving mode of the vehicle based on an operation of a mode conversion input. When the driving mode is converted into a custom mode, a mode setting screen for adjusting a setting value of a driving characteristic preset is configured and the configured mode setting screen is displayed on a display of the vehicle. A tuning device then tunes a driving characteristic of the custom mode based on a setting value adjusted on the mode setting screen.

12 Claims, 18 Drawing Sheets

(51) Int. Cl.
*B60W 30/188* (2012.01)
*B60W 20/10* (2016.01)

(58) Field of Classification Search
CPC . B60W 50/085; B60W 50/082; Y10S 903/93; B60K 2370/1438; B60K 2370/1442; B60K 2370/172; B60K 37/06; B60K 35/00
USPC .......................................................... 701/22
See application file for complete search history.

(56) References Cited

U.S. PATENT DOCUMENTS

| | | | | |
|---|---|---|---|---|
| 2009/0076682 | A1* | 3/2009 | Ghoneim | B60W 40/08 |
| | | | | 701/36 |
| 2009/0140698 | A1* | 6/2009 | Eberhard | H02J 7/04 |
| | | | | 320/152 |
| 2011/0307130 | A1* | 12/2011 | Gow | B60L 3/108 |
| | | | | 701/22 |
| 2013/0221928 | A1* | 8/2013 | Kelty | B60L 58/24 |
| | | | | 320/134 |
| 2014/0210608 | A1* | 7/2014 | Yamada | B60K 37/06 |
| | | | | 340/459 |
| 2017/0369052 | A1* | 12/2017 | Nagy | B60W 40/09 |
| 2018/0208209 | A1* | 7/2018 | Al-Dahle | B60W 10/22 |
| 2018/0370541 | A1* | 12/2018 | Cooke | B60W 50/085 |
| 2019/0031187 | A1* | 1/2019 | Noguerol | B60W 50/085 |
| 2019/0111925 | A1* | 4/2019 | Sata | B60W 10/30 |
| 2019/0294162 | A1* | 9/2019 | Sikorski | B60W 30/02 |

* cited by examiner

APPARATUS AND METHOD FOR CONTROLLING DRIVING MODE OF VEHICLE

CROSS-REFERENCE TO RELATED APPLICATION

This application is based on and claims the benefit of priority to Korean Patent Application No. 10-2017-0139499, filed on Oct. 25, 2017, the disclosure of which is incorporated herein in its entirety by reference.

TECHNICAL FIELD

The present disclosure relates to apparatuses and methods for controlling driving modes of vehicles, and more particularly, to an apparatus and method for controlling a vehicle driving mode by implementing a mode in which a driving characteristic is adjusted based on a user request.

BACKGROUND

Generally, various driving modes, such as an eco-mode, a normal mode, and a sport mode, may be set in an environment-friendly vehicle, such as a hybrid electric vehicle (HEV) or a plug-in HEV (PHEV). A driving mode may be changed by a button operation or other type of user input. A set driving mode may be fixed as a value set by a manufacturer. A driver may select any one of predetermined modes for convenience and the vehicle may be driven based on the selected predetermined mode. Thus, a driving environment in a predetermined driving mode may fail to meet all drivers.

SUMMARY

The present disclosure provides an apparatus and method for controlling a driving mode of a vehicle to increase driving satisfaction of a driver by implementing a mode in which a driving characteristic may be adjusted based on a request of the driver.

Another aspect of the present disclosure provides an apparatus and method for controlling a driving mode of a vehicle to allow a driver to more easily adjust a driving characteristic value on a mode setting screen including an adjustment bar that corresponds to each driving characteristic value. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a driving mode of a vehicle may include: a mode converter configured to convert the driving mode of the vehicle based on an operation of a mode conversion button, a screen configuration device configured to, when the driving mode is converted into a custom mode, configure a mode setting screen for adjusting a setting value of a driving characteristic preset in response to the custom mode and display the configured mode setting screen on a display of the vehicle, and a tuning device configured to tune or adjust a driving characteristic of the custom mode based on a setting value adjusted on the mode setting screen.

The mode converter may be configured to, when converting the driving mode into the custom mode, set an initial value of the custom mode based on a predetermined default value. The mode setting screen may include adjustment bars for adjusting setting values that correspond to one or more driving characteristics among an acceleration characteristic, a shift quality characteristic, an electric vehicle (EV) characteristic, and a regenerative braking characteristic of the vehicle.

The adjustment bar for adjusting the setting value that corresponds to the acceleration characteristic or the shift quality characteristic of the vehicle may be adjusted to any one of an eco-item, a normal item, or a sport item. The tuning device may be configured to tune an initial value set in response to the acceleration characteristic or the shift quality characteristic of the vehicle to a driving characteristic value of an eco-mode, a normal mode, or a sport mode, the driving characteristic value being adjusted by the adjustment bar.

The tuning device may be configured to tune at least one or more acceleration characteristics among an amount of launching torque, a torque variation tilt, and a shift pattern based on the driving characteristic value of the eco-mode, the normal mode, or the sport mode, the driving characteristic value being adjusted by the adjustment bar. The tuning device may be configured to tune at least one or more shift quality characteristics among a shift time and shift quality (G-profile) based on the driving characteristic value of the eco-mode, the normal mode, or the sport mode, the driving characteristic value being adjusted using the adjustment bar.

The adjustment bar for adjusting the setting value that corresponds to the EV characteristic or the regenerative braking characteristic of the vehicle may be adjusted to any one of stages 1 to 5. The tuning device may be configured to tune an initial value set in response to the EV characteristic or the regenerative braking characteristic of the vehicle to a driving characteristic value preset in response to a stage adjusted by the adjustment among stages 1 to 5.

Further, the tuning device may be configured to tune at least one or more EV characteristics among an engine driving point, an idle charging control state of charge (SOC) or a charging control SOC based on the driving characteristic value preset in response to the stage adjusted by the adjustment bar among stages 1 to 5. The tuning device may be configured to tune a regenerative braking torque value based on the driving characteristic value preset in response to the stage adjusted by the adjustment bar among stages 1 to 5. The driving mode may include an eco-mode, a normal mode, a sport mode, and the custom mode.

According to another aspect of the present disclosure, an apparatus for controlling a driving mode of a vehicle may include: a mode converter configured to convert the driving mode of the vehicle based on an operation of a mode conversion button, a driver recognizing device configured to, when the driving mode is converted into a custom mode, recognize a driver within the vehicle, a screen configuration device configured to, when the driving mode is converted into the custom mode, configure a mode setting screen for adjusting a driver setting value of a driving characteristic preset in response to the recognized driver and display the configured mode setting screen on a display of the vehicle, and a tuning device configured to tune a driving characteristic of the custom mode based on a setting value adjusted on the mode setting screen.

The mode converter may be configured to, when converting the driving mode into the custom mode, access a setting value of the driving characteristic preset in response to the recognized driver and set an initial value of the custom mode based on the called setting value. The apparatus may further include a storage configured to store a driver setting value of a driving characteristic preset in response to the driver. The tuning device may be configured to update the driver setting value stored in the storage, based on the tuned driving characteristic value.

According to another aspect of the present disclosure, a method for controlling a driving mode of a vehicle may include: converting the driving mode of the vehicle based on an operation of a mode conversion button, when the driving mode is converted into a custom mode, configuring a mode setting screen for adjusting a setting value of a driving characteristic preset in response to the custom mode and displaying the configured mode setting screen on a display of the vehicle, and tuning a driving characteristic of the custom mode based on a setting value adjusted on the mode setting screen.

According to another aspect of the present disclosure, a method for controlling a driving mode of a vehicle may include: converting the driving mode of the vehicle based on an operation of a mode conversion button, when the driving mode is converted into a custom mode, recognizing a driver within the vehicle, when the driving mode is converted into the custom mode, configuring a mode setting screen for adjusting a driver setting value of a driving characteristic preset in response to the recognized driver and displaying the configured mode setting screen on a display of the vehicle, and tuning a driving characteristic of the custom mode based on a setting value adjusted on the mode setting screen.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
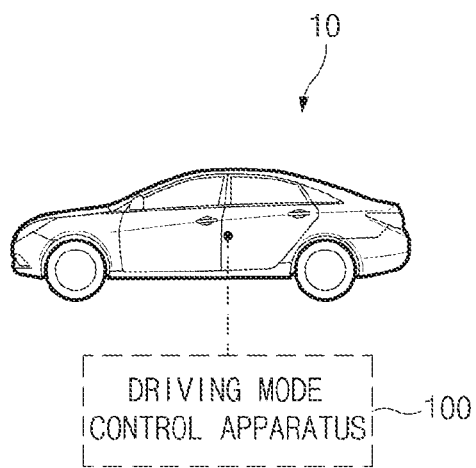
FIG. 1 is a view illustrating a vehicle system to which a driving mode control apparatus of a vehicle is applied, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. In adding reference denotations to elements of each drawing, although the same elements are displayed on a different drawing, it should be noted that the same elements have the same denotations. In addition, in describing an exemplary embodiment of the present disclosure, if it is determined that a detailed description of related well-known configurations or functions blurs the gist of an exemplary embodiment of the present disclosure, it will be omitted.

In describing elements of exemplary embodiments of the present disclosure, the terms $1^{st}$ $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a drawing illustrating a vehicle system to which a driving mode control apparatus of a vehicle is applied, according to an exemplary embodiment of the present disclosure. Referring to FIG. 1, a driving mode control apparatus 100 of a vehicle 10 may set a driving mode of the vehicle 10 based on a driver request or input and may tune or adjust a setting value of the set driving mode.

In particular, the driving mode may include a general driving mode, such as an eco-mode, a normal mode, and a sport mode, and a custom mode, a setting value of which may be changed by the driver. Herein, the general driving mode may be a mode, a setting value of which is fixed. The eco-mode may be a mode to which a fuel efficiency-oriented control strategy and a control strategy based on smooth launching acceleration are applied. The normal mode may be a mode to which a control strategy of further enhancing launching compared to the eco-mode and further providing a dynamic feeling compared to the eco-mode are applied. The sport mode may be a mode to which a control strategy of a launching torque tilt for providing a sense of sporty launching rather than fuel efficiency and a control strategy of a dedicated shift pattern are applied.

Meanwhile, the custom mode may be a mode, a default value of which may be set to a setting value of the eco-mode or a driver's unique setting value previously stored, in which a setting value of acceleration, shift quality, electric vehicle (EV) control, regenerative control, or the like may be adjusted by the driver. When the custom mode is selected, the driving mode control apparatus 100 (e.g., a controller) of the vehicle 10 may be configured to configure a mode setting screen on which a setting value may be adjusted and the controller may be configured to display the configured mode setting screen on a display screen. Thus, the driver may adjust a setting value on the mode setting screen displayed on the display screen.

Thus, a description will be given in detail of a detailed configuration of the driving mode control apparatus 100 of the vehicle 10 with reference to FIG. 2. The driving mode control apparatus 100 of the vehicle 10 may be implemented in the vehicle 10. In particular, the driving mode control apparatus 100 of the vehicle 10 may be integrated with controllers within the vehicle 10. Alternatively, the driving mode control apparatus 100 of the vehicle 10 may be implemented as a separate apparatus to be connected with controllers of the vehicle 10 by a separate connection means.

Figure 2:
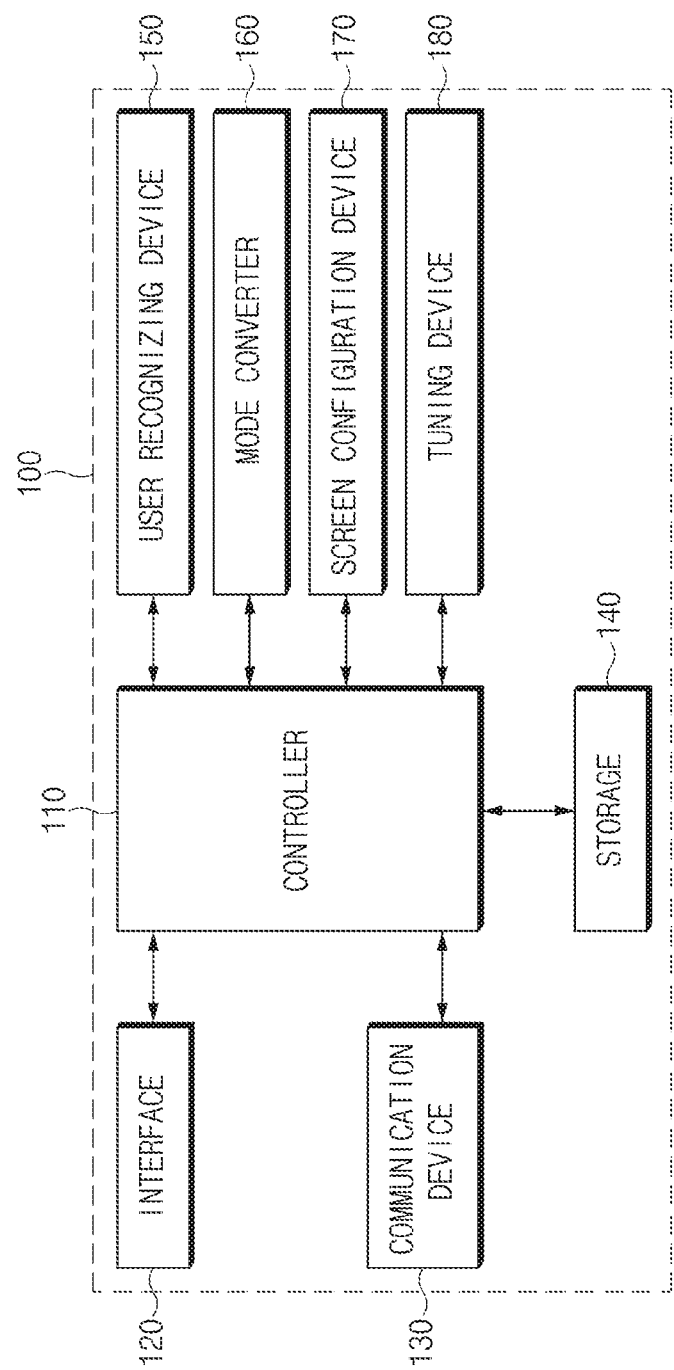
FIG. 2 is a block diagram illustrating a configuration of a driving mode control apparatus of a vehicle according to an exemplary embodiment of the present disclosure.

FIG. 2 is a block diagram illustrating a configuration of a driving mode control apparatus of a vehicle according to an exemplary embodiment of the present disclosure. Referring to FIG. 2, a driving control apparatus 100 of a vehicle may include a controller 110, an interface 120, a communication device 130, a storage 140, a driver recognizing device 150, a mode converter 160, a screen configuration device 170, and a tuning device 180. Herein, the controller 110 may be configured to process a signal transmitted between the components of the driving mode control apparatus 100 and operate each component.

The interface 120 may include an input device configured to receive a control instruction from a user and an output configured to output an operation state, an operation result, and the like of the driving mode control apparatus 100. The input may include a key button and may further include a mouse, a joystick, a jog shuttle, a stylus pen, and the like configured to receive a user input. The input may also include a soft key implemented on a display of the vehicle.

The output may include the display and may further include a voice output such as a speaker. In particular, when a touch sensor such as a touch film, a touch sheet, or a touch pad is installed in the display, the display may operate as a touch screen and may be implemented in the form of integrating the input with the output. For example, the display may be configured to display a mode setting screen. The user may drag an adjustment bar on the mode setting screen to adjust a mode setting value. In other words, the user may move a finger along a scroll displayed on the screen to thus adjust the mode setting value.

Particularly, the display may include at least one of a liquid crystal display (LCD), a thin film transistor-LCD (TFT-LCD), an organic light-emitting diode (OLED), a flexible display, a field emission display (FED), and a three-dimensional (3D) display. The communication device 130 may include a communication module for supporting a communication interface with electronics and/or controllers mounted on the vehicle. For example, the communication module may be configured to transmit control information tuned based on a setting value adjusted by the driver to a driving control system or each driving unit corresponding to acceleration, shift quality, EV, and regenerative braking of the vehicle in a custom mode.

Herein, the communication module may include a module for supporting vehicle network communication such as controller area network (CAN) communication, local interconnect network (LIN) communication, and flex-ray communication. Further, the communication module may include a module for wireless Internet access or a module for short range communication. Herein, wireless Internet technologies may include a wireless local area network (WLAN), wireless broadband (Wibro), wireless-fidelity (Wi-Fi), world interoperability for microwave access (Wimax), and the like. Short range communication technologies may include Bluetooth, ZigBee, ultra wideband (UWB), radio frequency identification (RFID), infrared data association (IrDA), and the like.

The storage 140 may be configured to store data, an algorithm, and/or the like necessary for an operation of the apparatus 100. In particularly, the storage 140 may be configured to store a setting value for each driving mode. Further, the storage 140 may be configured to store a setting value of the custom mode, adjusted on a mode setting screen. The storage 140 may also be configured to store driver identification information and store a driver setting value for a driving characteristic of the custom mode.

Additionally, the storage 140 may be configured to store an instruction, an algorithm, and/or the like for configuring a mode setting screen and tuning a setting value of the custom mode. Herein, the storage 140 may include storage media such as a random access memory (RAM), a static RAM (SRAM), a read-only memory (ROM), a programmable ROM (PROM), and an electrically erasable PROM (EEPROM).

The driver recognizing device 150 may be configured to recognize or detect a driver within the vehicle. Herein, the driver recognizing device 150 may include a camera (not shown) or other imaging device configured to recognize appearance information, such as a face and/or a body type of the driver, and may further include one or more sensors (not shown) configured to detect the driver. In particular, the camera may be configured to capture an image of the driver in the vehicle and may be disposed in front of, for example, a driver's seat, but is not limited to such a location. Further, the one or more sensors may include a sensor configured to detect biometric information of the driver, a sensor configured to detect an action or movement of the driver, and/or the like. In addition, the one or more sensors may include any of sensors which may recognize the driver. In response to recognizing the driver, the driver recognizing device 150 may be configured to transmit the recognized driver information to the controller 110, the mode converter 160, and/or the tuning device 180.

Meanwhile, the driver recognizing device 150 may be omitted according to an implementation form of the present disclosure. For example, when an initial value for acceleration, shift quality, EV, and regenerative braking is set based on a predetermined default value for each driving characteristic of the custom mode, the driver recognizing device 150 may be omitted.

Figure 3:
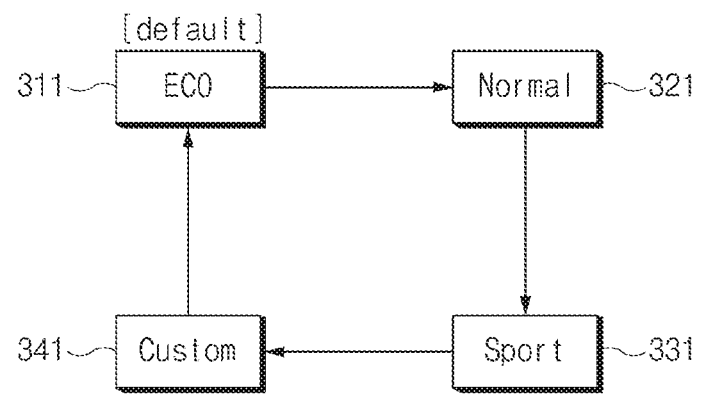
FIGS. 3, 4, 5, 6A, 6B, 7, 8A, 8B, 8C, 9, 10, 11, and 12 are drawings illustrating an operation of a driving mode control apparatus of a vehicle according to an exemplary embodiment of the present disclosure.

The mode converter 160 may be configured to convert a driving mode of the vehicle. A description will be given of an exemplary embodiment of converting the driving mode of the vehicle with reference to FIG. 3. FIG. 3 is a drawing illustrating an operation of a driving mode control apparatus of a vehicle according to an exemplary embodiment of the present disclosure. As shown in FIG. 3, the driving mode of the vehicle may include an eco-mode 311, a normal mode 321, a sport mode 331, and a custom mode 341. A mode converter 160 of FIG. 2 may be configured to convert the driving mode of the vehicle into the eco-mode 311, the normal mode 321, the sport mode 331, or the custom mode 341 based on the operation of the mode conversion button.

In particular, the mode converter 160 may be configured to set the eco-mode 311 to a default and sequentially convert a driving mode in an order of the eco-mode 311, the normal mode 321, the sport mode 331, and the custom mode 341 based on the number of button operations. For example, the mode conversion button may be a hybrid electric vehicle (HEV) button.

When converting a driving mode into the eco-mode 311, the normal mode 321, the sport mode 331, or the custom mode 341, the mode converter 160 may be configured to set a control value for acceleration, shift quality, EV, and regenerative braking based on a predetermined setting value. In particular, when converting a control mode into the custom mode 341, the mode converter 160 may be configured to set an initial value for acceleration, shift quality, EV, and regenerative braking based on a predetermined default value or a driver setting value stored in response to the driver recognized by a driver recognizing device 150 of FIG. 2.

When the driving mode of the vehicle is converted into the custom mode 341, a screen configuration device 170 of FIG. 2 may configure a mode setting screen for adjusting a control value for acceleration, shift quality, EV, and regenerative braking. The screen configuration device 170 may be configured to display the configured mode setting mode on a display screen of an interface 120 of FIG. 2.

Figure 4:
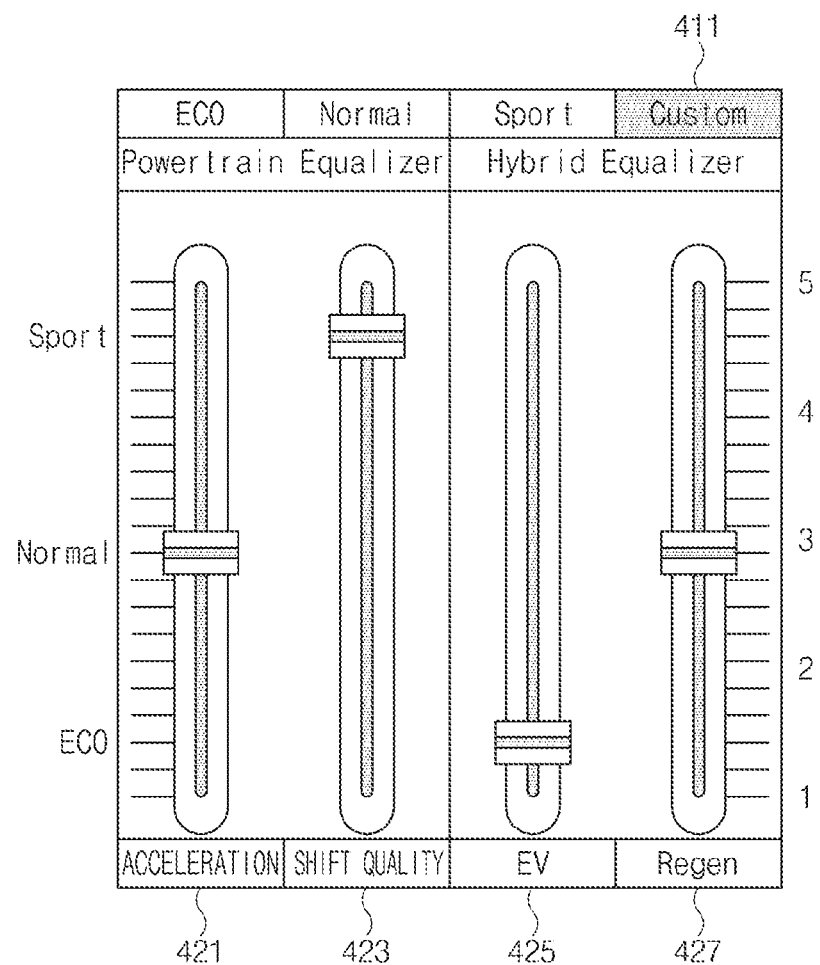

A description will be given of an exemplary embodiment of the mode setting screen with reference to FIG. 4. FIG. 4 is a drawing illustrating an operation of a driving mode control apparatus of a vehicle according to an exemplary embodiment of the present disclosure. As shown in FIG. 4, a mode setting screen for a custom mode 411 may include four adjustment bars for setting values for acceleration 421, shift quality 423, EV 425, and regenerative braking 427.

Figure 5:
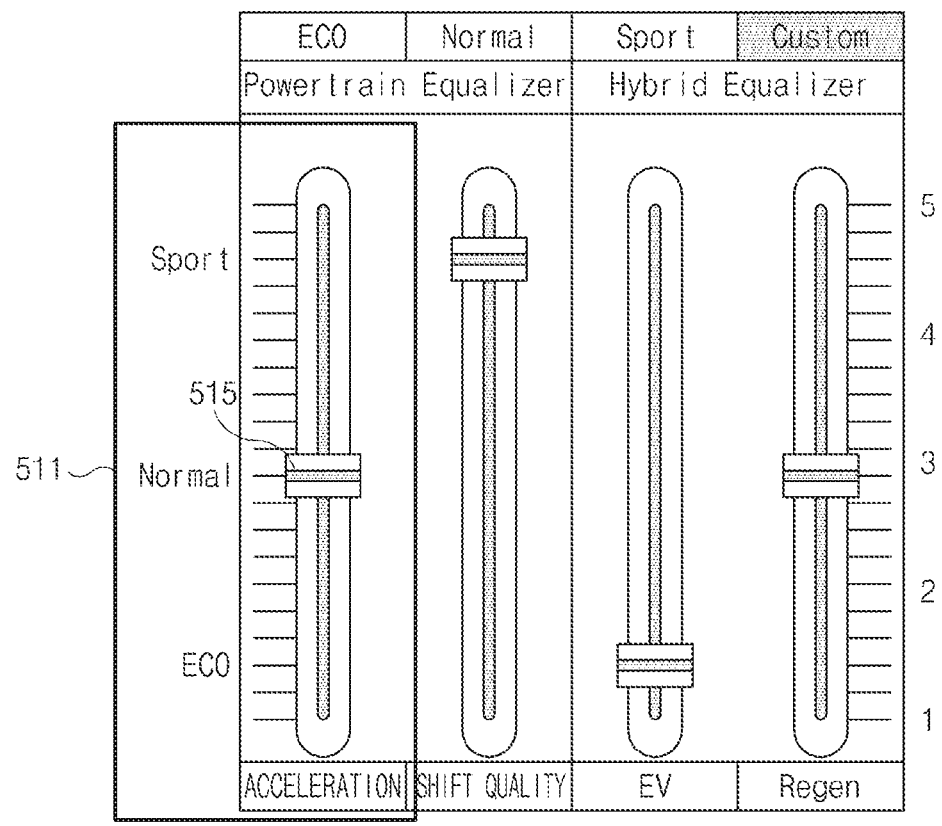
Figure 6A:
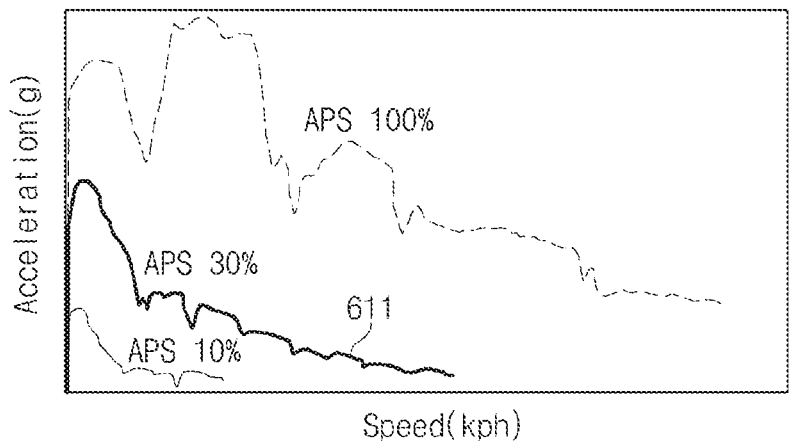
Figure 6B:
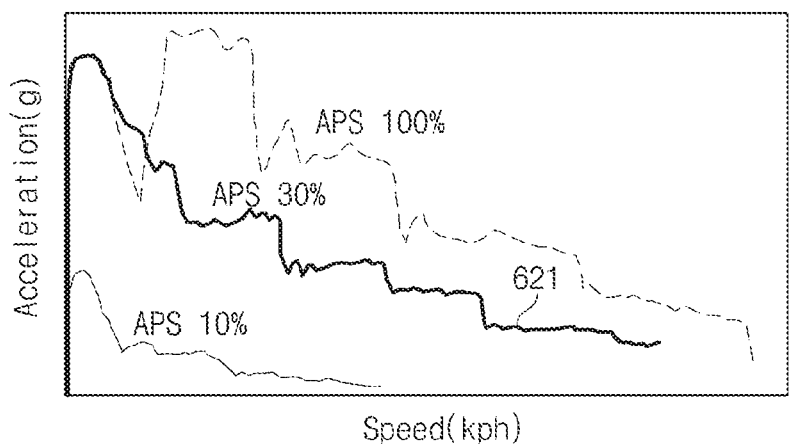

A description will be given of an exemplary embodiment of operating an adjustment bar on the mode setting screen of the custom mode 411 to adjust a setting value for acceleration 421, shift quality 423, EV 425, or regenerative braking 427. First of all, FIGS. 5 to 6B illustrate an exemplary embodiment of tuning an acceleration characteristic. Referring to FIG. 5, an item for acceleration 511 may be related to adjusting launching performance according to an operation of an accelerator pedal sensor (APS). Thus, a driver may touch and/or drag an adjustment bar 515 that corresponds to the item (e.g., displayed item that corresponds to acceleration) for acceleration 511. In particular, the driver may adjust the adjustment bar 515 of the item for acceleration 511 to any one of three items of 'ECO', 'Normal', or 'Sport'.

When the adjustment bar 515 of the item for acceleration 511 is adjusted to any one of the three items of 'ECO', 'Normal', or 'Sport', a tuning device 180 of FIG. 2 may tune an acceleration characteristic of a custom mode to an acceleration characteristic of any one of an eco-mode, a normal mode, or a sport mode. Herein, in the acceleration characteristic, an amount of launching torque may be differentiated from a torque variation tilt (including a filter) in the eco-mode, the normal mode, or the sport mode in the same APS amount. A shift pattern may be changed according to the eco-mode, the normal mode, or the sport mode to dynamically have an output difference for each stage.

For example, when the adjustment bar 515 of the item for acceleration 511 is adjusted to the item of 'ECO', the tuning device 180 may be configured to tune or adjust (e.g., adjust in minimal increments) the acceleration characteristic of the custom mode to an acceleration characteristic of the eco-mode. The acceleration characteristic of a vehicle, tuned to the acceleration characteristic of the eco-mode, may be shown in FIG. 6A. Reference numeral 611 in FIG. 6A may indicate an equivalent power curve.

Further, when the adjustment bar 515 of the item for acceleration 511 is adjusted to the item of 'Sport', the tuning device 180 may be configured to tune the acceleration characteristic of the custom mode to an acceleration characteristic of the sport mode. The acceleration characteristic of the vehicle, tuned to the acceleration characteristic of the sport mode, may be shown in FIG. 6B. Reference numeral 621 in FIG. 6B may indicate an equivalent torque curve. Herein, an acceleration characteristic of the normal mode may be tuned to a middle value between the eco-mode and the sport mode.

Figure 7:
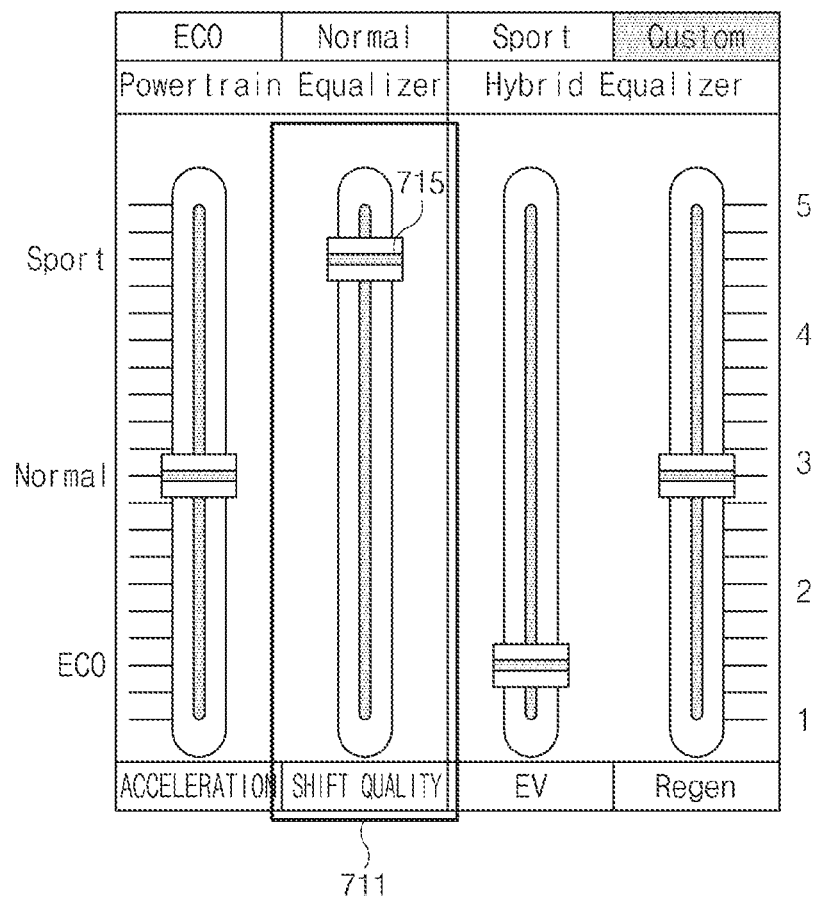
Figure 8A:
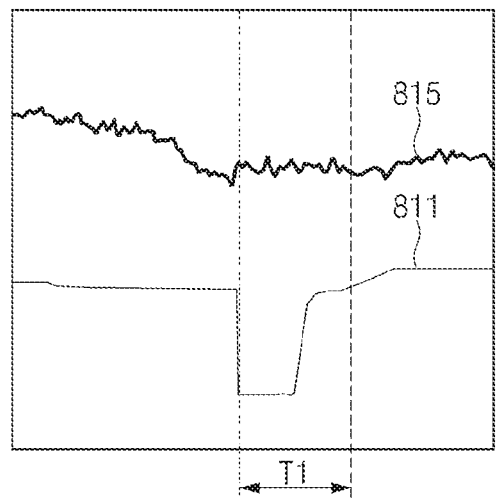
Figure 8B:
Figure 8C:
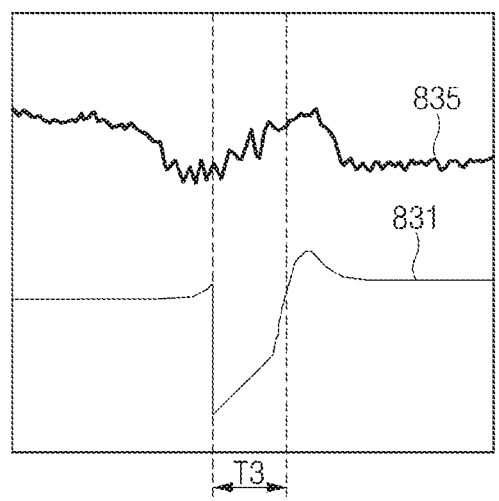

FIGS. 7 to 8C illustrate an exemplary embodiment of tuning a shift quality characteristic. Referring to FIG. 7, an item for shift quality 711 may be related to adjusting a shift time and shift quality. Thus, as shown in FIG. 7, a driver may touch and/or drag an adjustment bar 715 that corresponds to the item for shift quality 711. In particular, the driver may adjust the adjustment bar 715 of the item for shift quality 711 to any one of three items of 'ECO', 'Normal' and 'Sport'.

When the adjustment bar 715 of the item for shift quality 711 is adjusted to any one of the three items of 'ECO', 'Normal', and 'Sport', a tuning device 180 of FIG. 2 may be configured to tune a shift quality characteristic of a custom mode to a shift quality characteristic of any one of an eco-mode, a normal mode, or a sport mode. Herein, the shift quality characteristic may be to differentiate a shift time and shift quality (G-profile) by adding motor torque control to a general transmission control unit (TCU) oil pressure/torque control to provide more dynamic control performance to the driver.

For example, when the adjustment bar 715 of the item for shift quality 711 is adjusted to the item of 'ECO', the tuning device 180 may be configured to tune the shift quality characteristic of the custom mode to a shift quality characteristic of the eco-mode. The shift quality characteristic of a vehicle, tuned to the shift quality characteristic of the eco-mode, may be shown in FIG. 8A. Reference numeral 811 in FIG. 8A may indicate an input torque, and reference numeral 815 may indicate shift quality (G-profile). A shift time may be T1.

Further, when the adjustment bar 715 of the item for shift quality 711 is adjusted to the item of 'Normal', the tuning device 180 may be configured to tune the shift quality characteristic of the custom mode to a shift quality characteristic of the normal mode. The shift quality characteristic of the vehicle, tuned to the shift quality characteristic of the normal mode, may be shown in FIG. 8B. Reference numeral 821 in FIG. 8B may indicate an input torque, and reference numeral 825 may indicate shift quality (G-profile). A shift time may be T2.

Further, when the adjustment bar 715 of the item for shift quality 711 is adjusted to the item of 'Sport', the tuning device 180 may be configured to tune the shift quality characteristic of the custom mode to a shift quality characteristic of the sport mode. The shift quality characteristic of the vehicle, tuned to the shift quality characteristic of the sport mode, may be shown in FIG. 8C. Reference numeral 831 in FIG. 8C may indicate an input torque, and reference numeral 835 may indicate shift quality (G-profile). A shift time may be T3. Herein, the shift times T1 to T3 of the eco-mode, the normal mode, and the sport mode may be T1>T2>T3.

Figure 9:
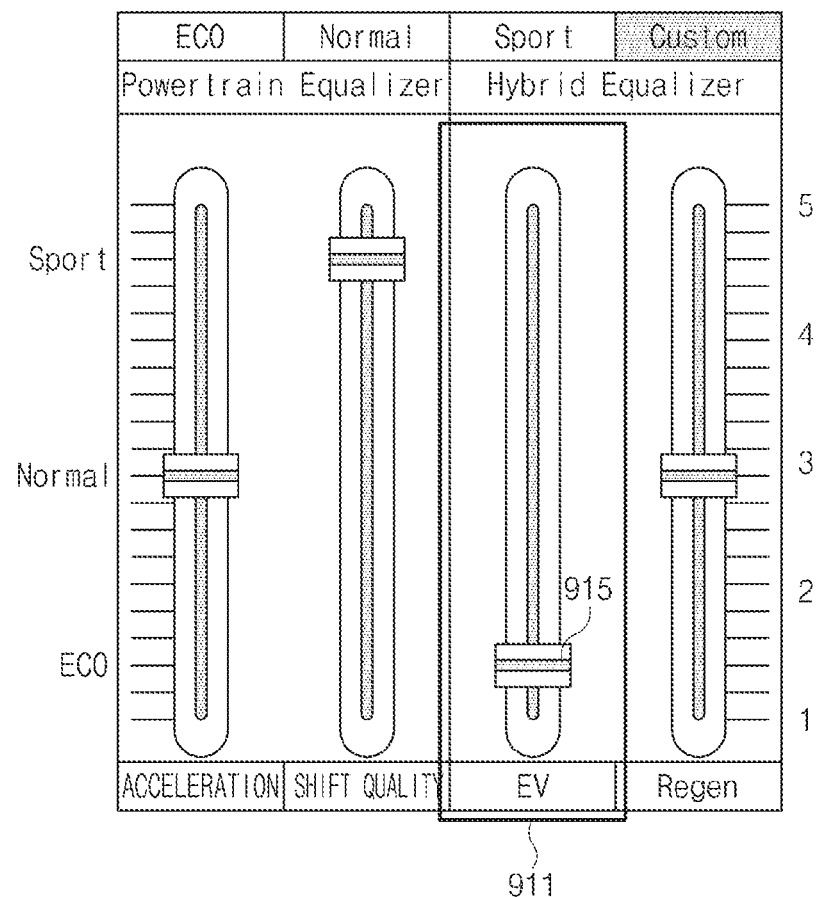
Figure 10:
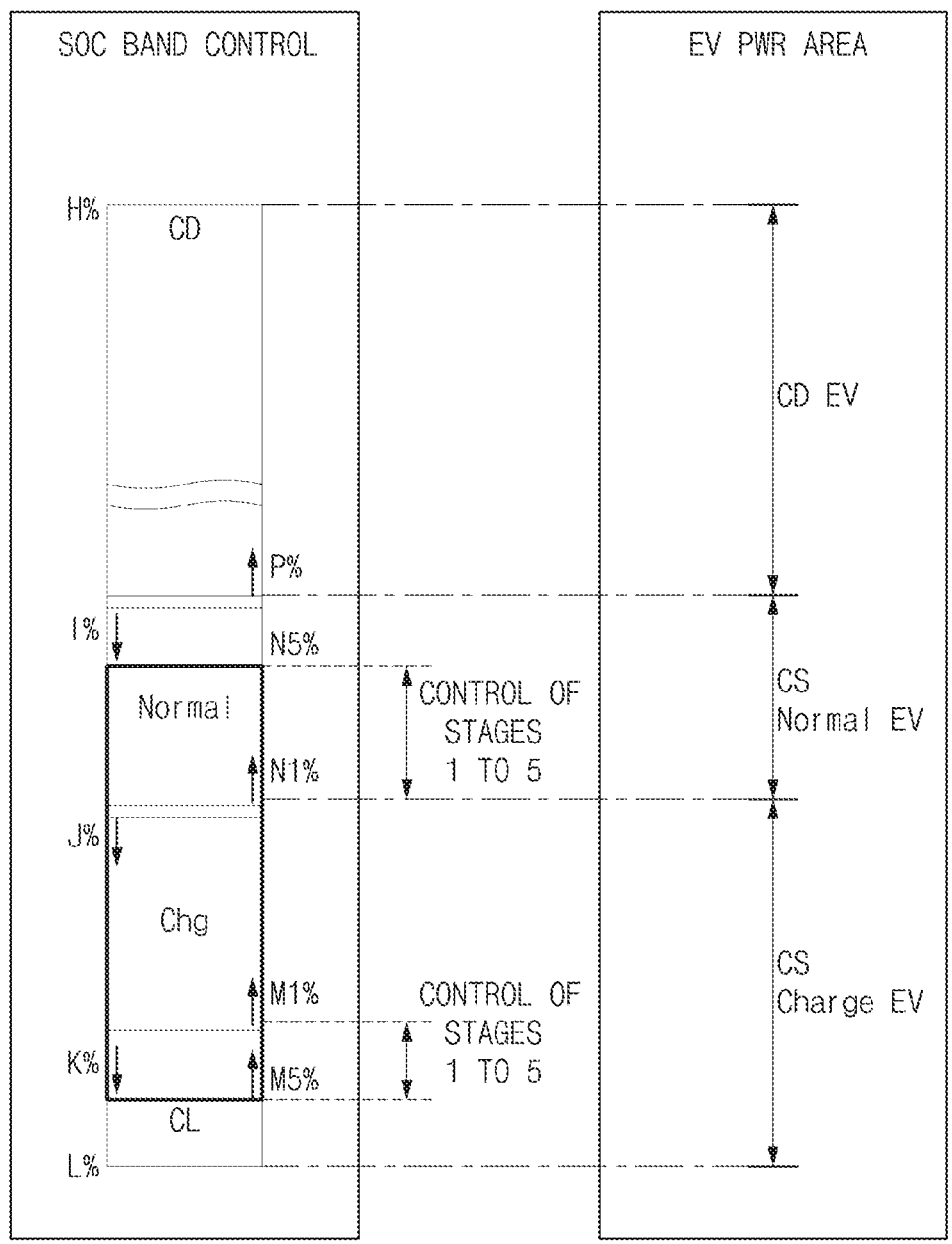

FIGS. 9 and 10 illustrate an exemplary embodiment of an EV characteristic. In particular, EV performance in a plug-in hybrid electric vehicle (PHEV) may be divided into a charge depleting (CD) mode and a charge sustaining (CS) mode. Meanwhile, EV performance in an HEV may correspond to the CS mode. The CD mode may be a mode of maintaining only EV driving performance in charge depleting. An item for EV 911 in the CD mode may be related to restraining an engine from being turned on although a driver request of a maximum output or more of a motor is received in a system where EV performance is provided for each stage and selecting how long EV driving performance is maintained.

Thus, as shown in FIG. 9, a driver may touch and/or drag an adjustment bar 915 that corresponds to the item for EV 911. In particular, the driver may adjust the adjustment bar 915 that corresponds to the item for EV 911 to any one of stages 1 to 5. Herein, stage 1 of the CD mode may be a stage for turning on the engine at the maximum output or more of the motor and meeting a driver request output.

Further, stages 2 to 4 of the CD mode may be a stage for turning on the engine in response to receiving a driver request at a constant percentage (%) or greater to the maximum output of the motor. As stage 2 goes to stage 4, a percentage (%) to the maximum output of the motor may continuously increase. Further, stage 5 of the CD mode may be a stage for maximally maintaining the maximum output of the motor although any driver request is output without a specific condition (e.g., a kick-down switch on) and preventing the engine from being turned on.

Meanwhile, the CS mode may be a mode for maintaining EV driving performance based on charge sustaining and may refer to HEV driving. As shown in FIG. 9, the driver may touch and/or drag the adjustment bar 915 that corresponds to the item for EV 911. In particular, the driver may select how long (e.g., a time period) EV driving performance is sustained in a conventional HEV mode (e.g., an eco-mode, a normal mode, or a sport mode) by adjusting the adjustment bar 915 that corresponds to the item for EV 911 to any one of stages 1 to 5.

Herein, stage 1 of the CS mode may be a stage for performing HEV mode driving in which a 1-stage engine clutch is combined, EV driving for each vehicle speed/each APS, a D-range stop state, or idle charging control upon deterioration in state of charge (SOC). In response to the adjustment of the adjustment bar 915 of the item for EV 911 to stage 1, a tuning device 180 of FIG. 2 may be configured to tune an EV characteristic of a custom mode to a setting value corresponding to stage 1 of the CS mode. In particular, the tuning device 180 may be configured to tune an idle charging start SOC to M1% OF FIG. 10 and may be configured to tune a battery charging end SOC to N1% of FIG. 10.

Meanwhile, stage 5 of the CS mode may be a stage for maintaining EV driving (e.g., restraining the engine from being turned on) to about 30 kph upon stop launching, performing a D-range stop state (brake on/slop=stage 1), prohibiting hybrid starter generator (HSG) idle charging, turning on the engine, and further upwardly controlling an engine operation point than stage 1 for charging during HEV driving. When the driver adjusts the adjustment bar 915 of the item for EV 911 to stage 5 of the CS mode, the tuning device 180 may be configured to tune the EV characteristic of the custom mode to a setting value corresponding to stage 5 of the EV characteristic. In particular, the tuning device 180 may be configured to tune an idle charging start SOC to M5% of FIG. 10 and tune a battery charging end SOC to N5% of FIG. 10.

Further, when the adjustment bar 915 of the item for EV 911 is adjusted to any one of stages 2 to 4 of the CS mode, the tuning device 180 may be configured to tune the EV characteristic of the custom mode to a setting value that corresponds to any one of stages 2 to 4 of the CS mode. Herein, the setting value that corresponds to any one of stages 2 to 4 may be a value between stages 1 and 5. For example, when tuning the EV characteristic to stage 2 of the CS mode, the tuning device 180 may be configured to tune the idle charging start SOC to M2% and tune the battery charging end SOC to N2%. When tuning the EV characteristic to stage 3 of the CS mode, the tuning device 180 may be configured to tune the idle charging start SOC to M3% and tune the battery charging end SOC to N3%. When tuning the EV characteristic to stage 4 of the CS mode, the tuning device 180 may be configured to tune the idle charging start SOC to M4% and tune the battery charging end SOC to N4%.

FIG. 10 illustrates an EV mode according to a SOC of the battery. Referring to FIG. 10, a PHEV may be configured to operate in a CD mode in an interval where an SOC is from P % to H %. The PHEV may be configured to operate in a CS mode in an interval where the SOC is from L % to P %. When the SOC is less than 1% while the PHEV operates in the CD mode, the PHEV may be configured to convert the CD mode into the CS mode to operate in the CS mode. When the SOC is greater than P % while the PHEV operates in the CD mode, the PHEV may be configured to convert the CS mode into the CD mode to operate in the CD mode.

In particular, when the SOC is less than or equal to J %, the PHEV may enter a charging interval. When the SOC is less than or equal to K %, the PHEV may start to perform charging control. Further, when the SOC is greater than or equal to a percentage (%) value that corresponds to a setting stage of the CS mode among values of M1% to M5%, the PHEV may be configured to start idle charging control. When the SOC is greater than or equal to a percentage (%) value that corresponds to the setting stage of the CS mode among values of N1% to N5%, the PHEV may be configured to terminate charging control. For example, H, I, J, K, L, M1~M5 and N1~N5 may have a values between 5 and 96 percentage (%).

Figure 11:
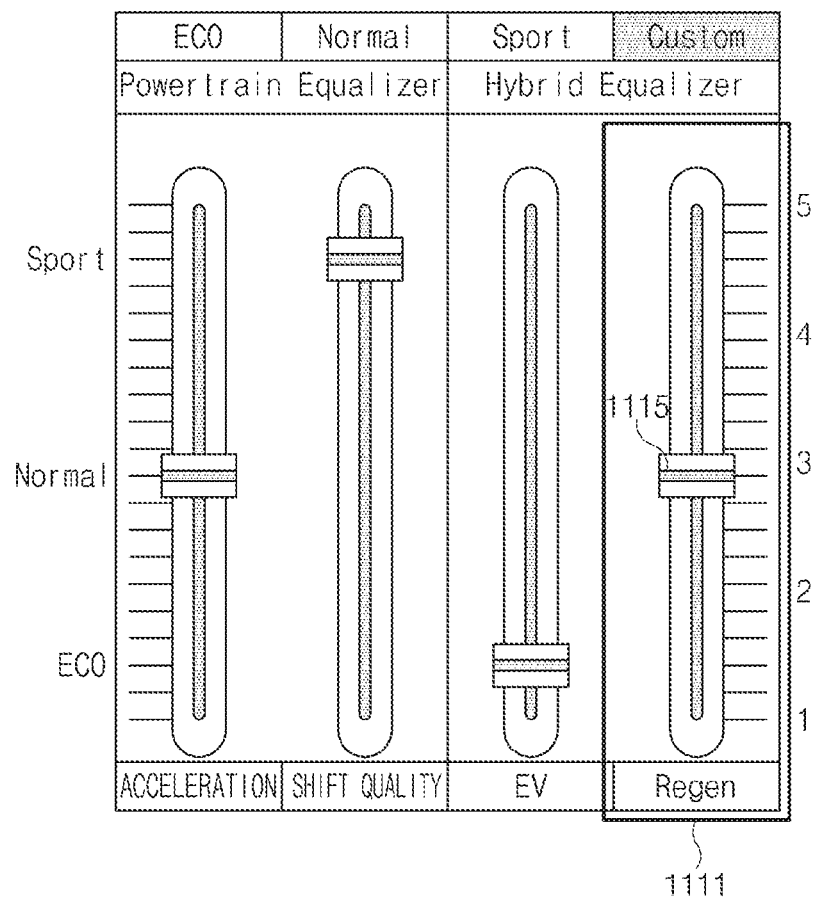
Figure 12:
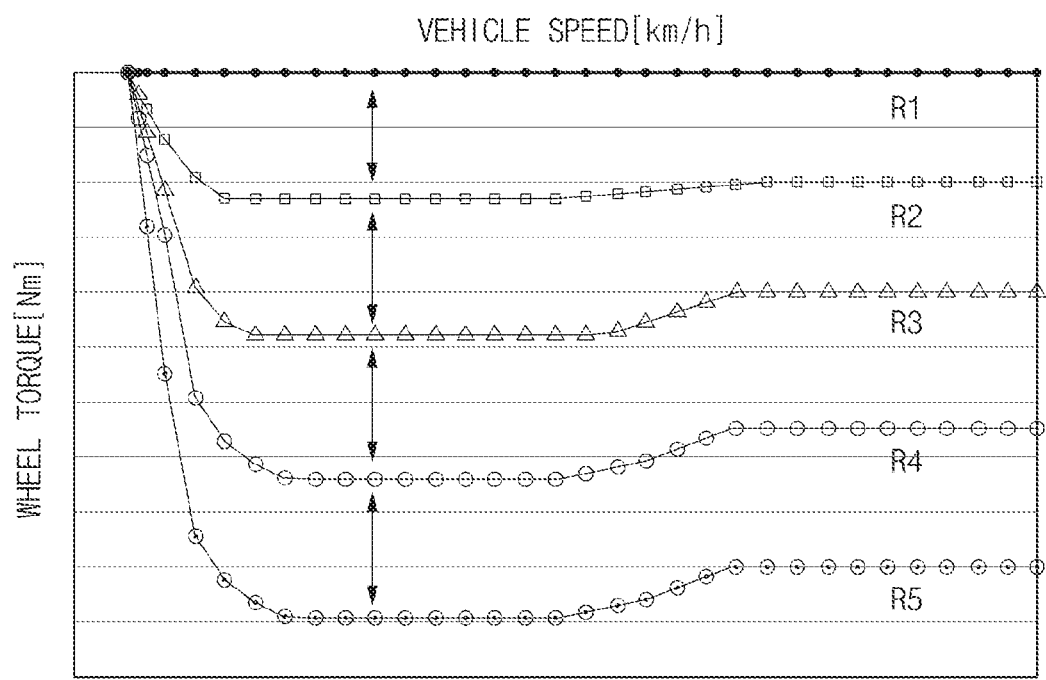

FIGS. 11 and 12 illustrate an exemplary embodiment of tuning a regenerative characteristic (e.g., regenerative braking). Referring to FIG. 11, an item for regenerative 1111 may be related to adjusting an amount of regenerative braking in a coasting driving condition (e.g., APS tip out during driving or brake off coastdown) to correspond to a driver preference. Thus, as shown in FIG. 11, a driver may touch and/or drag an adjustment bar 1115 that corresponds to the item for regen 1111 (regenerative). In particular, the driver may adjust the adjustment bar 1115 that corresponds to the item for regenerative 1111 to any one of stages 1 to 5.

When the adjustment bar 1115 that corresponds to the item for regenerative 1111 is adjusted to any one of stages 1 to 5, the tuning device 180 may be configured to tune a regenerative characteristic of a custom mode to a regenerative braking characteristic that corresponds to any one of stages 1 to 5. For example, when tuning the adjustment bar 1115 corresponding to the item for regenerative 1111 to stage 1, the tuning device 180 may be configured to tune regenerative braking torque to 0 Nm. In particular, the regenerative braking torque (creep torque) may be charged by a minimum electronics load power necessary for a system. Herein, a regenerative characteristic that corresponds to stage 1 may be shown in graph R1 of FIG. 12. In particular, since the regenerative braking torque is 0 Nm in stage 1, an amount of deceleration variation may be 0 g and there may be only deceleration according to resistance to vehicle driving. Further, a coastdown driving distance may be substantially long in stage 1 like N-range control.

The tuning device 180 may be configured to sequentially and upwardly adjust regenerative braking torque (charging power) for each stage based on a stage adjusted by the adjustment bar 1115 that corresponds to the item for regenerative 1111. Herein, a regenerative characteristic that corresponds to stage 2 may be shown in graph R2 of FIG. 12. A regenerative characteristic that corresponds to stage 3 may be shown in graph R3 of FIG. 12. A regenerative characteristic that corresponds to stage 4 may be shown in graph R4 of FIG. 12. A regenerative characteristic that corresponds to stage 5 may be shown in graph R5 of FIG. 12.

In stage 5, a driver may feel deceleration of a degree when the brake is engaged using about 0.14 g (brake=25%) without stepping on the brake pedal, and maximum motor charging (regenerative braking) may be performed. When a regenerative characteristic is tuned to stage 5, since an amount of energy recovery is increased, a fuel efficiency increase effect may be optimized and one-pedal acceleration and deceleration control may be performed more easily to increase convenience of a driver. Accordingly, a driving mode control apparatus 100 of a vehicle of FIG. 2 according to an exemplary embodiment of the present disclosure may increase satisfaction of the driver by setting a driving mode to a custom mode and tuning an acceleration characteristic, a shift quality characteristic, an EV characteristic, and a regen characteristic depending on a request of the driver.

The apparatus 100 according to an exemplary embodiment of the present disclosure may be implemented in the form of an independent hardware device including a memory and a processor for processing each operation. Alternatively, the apparatus 100 may be driven in the form of being included in another hardware device such as a microprocessor or a universal computer system. Further, a controller 110, a driver recognizing device 150, a mode converter 160, a screen configuration device 170, and a tuning device 180 of the apparatus 100 according to an exemplary embodiment of the present disclosure may be implemented as at least one or more processors.

Figure 13:
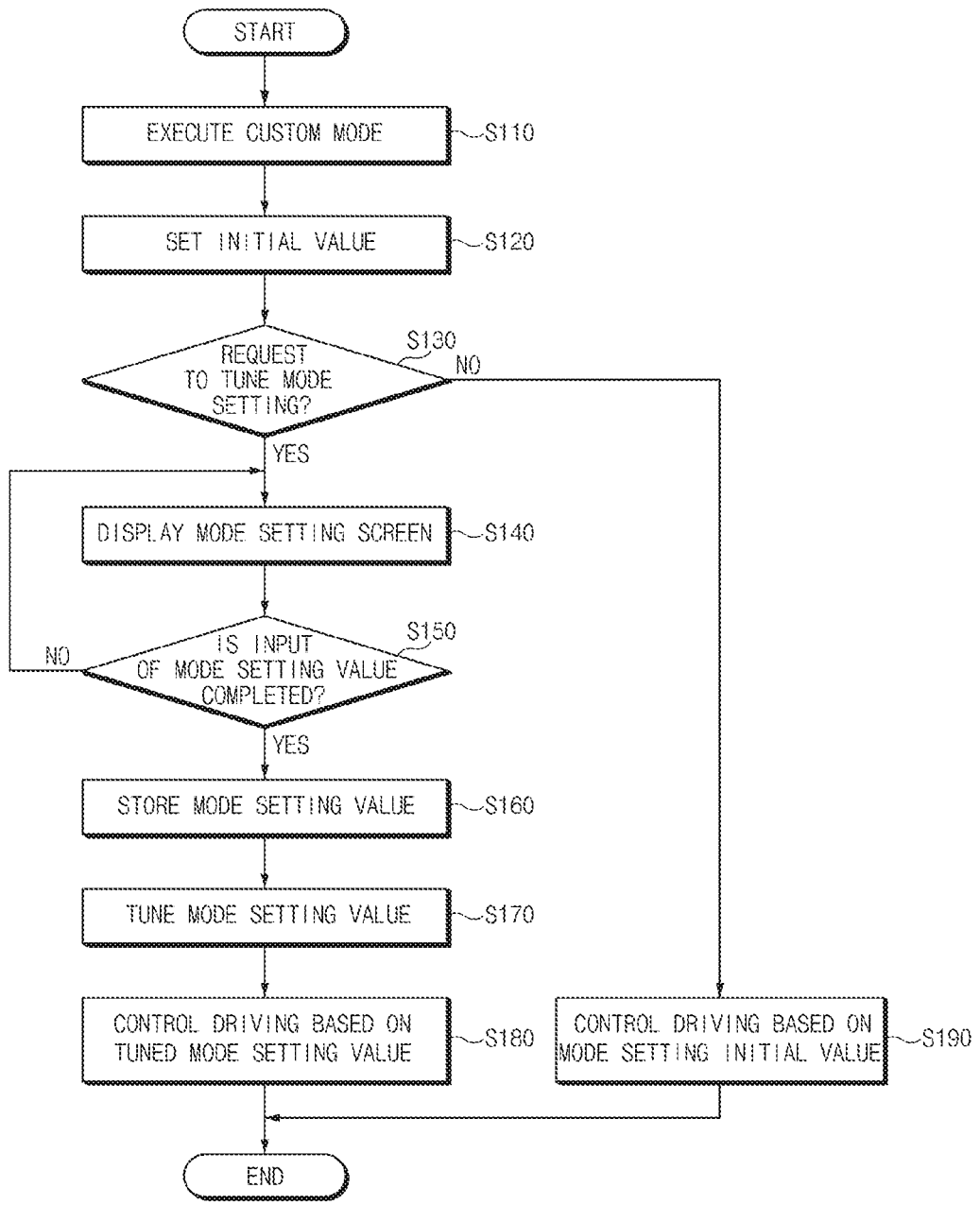
FIG. 13 is a flowchart illustrating an operation of a driving mode control method of a vehicle according to an exemplary embodiment of the present disclosure.

A description will be given in detail of an operation of the driving mode control apparatus 100 according to an exemplary embodiment of the present disclosure. FIG. 13 is a flowchart illustrating an operation of a driving mode control method of a vehicle according to an exemplary embodiment of the present disclosure. Referring to FIG. 13, a driving mode control apparatus 100 of the vehicle of FIG. 2 may be configured to adjust a driving mode of the vehicle as an eco-mode, a normal mode, a sport mode, or a custom mode.

When the custom mode is selected by a driver input or selection, in operation S110, the driving mode control apparatus 100 may be configured to execute the custom mode. In operation S120, the driving mode control apparatus 100 may be configured to set an initial value for each of driving control items, for example, an acceleration characteristic, a shift quality characteristic, an EV characteristic, and/or a regen characteristic to a predetermined default value. For example, the initial value of the custom mode may be set to a setting value of the eco-mode. When the driver does not input any mode setting adjustments to the custom mode in operation S130, in operation S190, the driving mode control apparatus 100 may be configured to operate the vehicle based on the initial value set in operation S120. In particular, the driving mode control apparatus 100 may be configured to transmit driving control information that corresponds to the set initial value to a control system or the like of the vehicle.

Meanwhile, in response to receiving a tuning or adjustment request to the mode setting of the custom mode in operation S130, in operation S140, the driving mode control apparatus 100 may be configured to configure a mode setting screen and display the configured mode setting screen on a display. Even when no tuning request of the mode setting of the custom mode is received, if an initial setting is completed, the driving mode control apparatus 100 may be configured to configure a mode setting screen and display the configured mode setting screen on the display.

Herein, the mode setting screen may include four adjustment bars for adjusting setting values for the acceleration characteristic, the shift quality characteristic, the EV characteristic, and the regen characteristic. Thus, the driver may touch or drag the four adjustment bars to adjust and input mode setting values.

When the input of the mode setting value is completed on the mode setting screen displayed on the display in operation S150, in operation S160, the driving mode control apparatus 100 may be configured to store the mode setting value input by the driver in a storage 140 (e.g., memory) of FIG. 2. In operation S170, the driving mode control apparatus 100 may be configured to tune the mode setting value of the custom mode. In operation S180, the driving mode control apparatus 100 may be configured to operate the vehicle based on the mode setting value tuned in operation S170. In particular, the driving mode control apparatus 100 may be configured to transmit driving control information that corresponds to the tuned mode setting value to the control system or the like of the vehicle.

Figure 14:
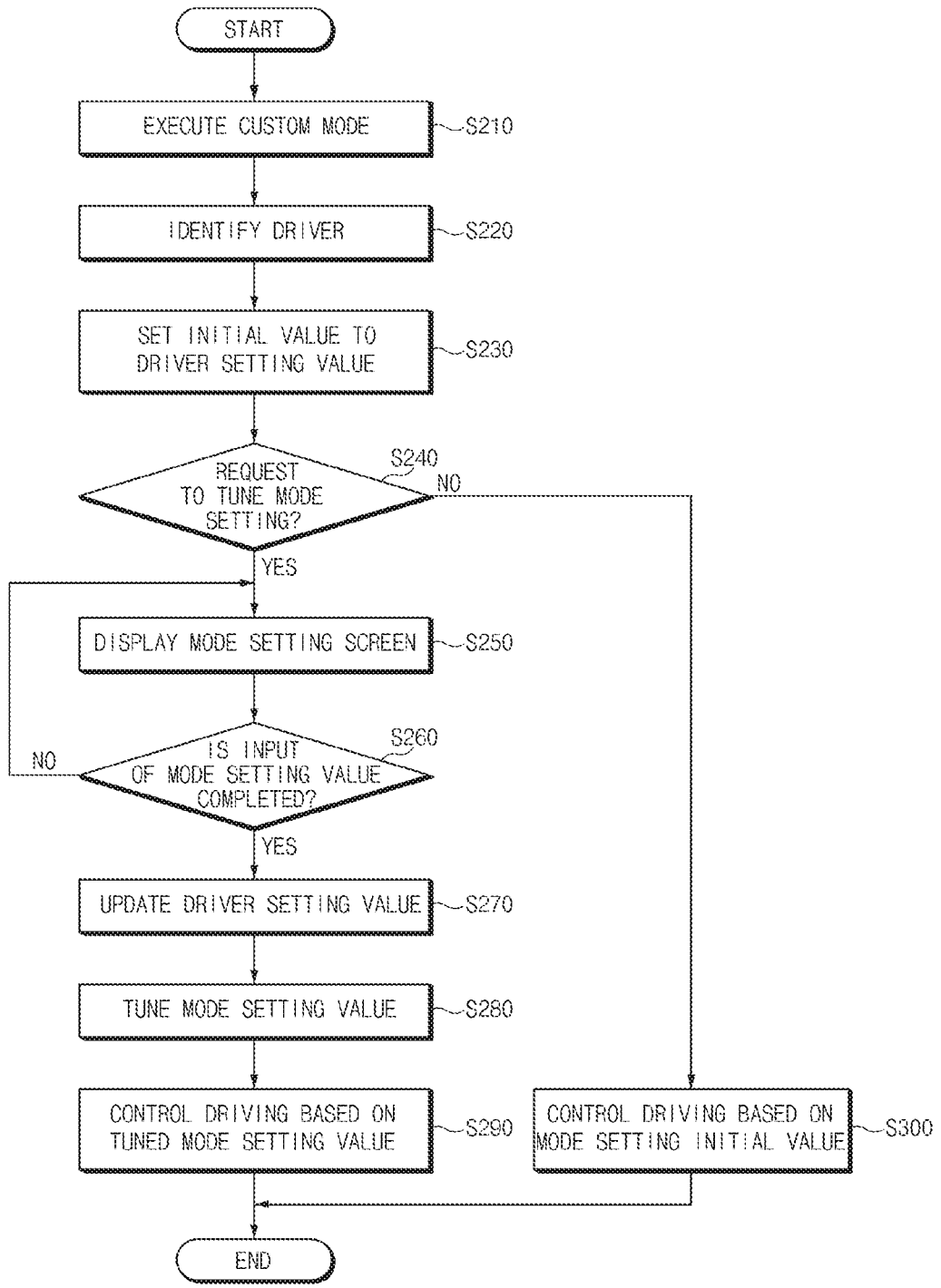
FIG. 14 is a flowchart illustrating an operation of a driving mode control method of a vehicle according to another exemplary embodiment of the present disclosure.

FIG. 14 is a flowchart illustrating an operation of a driving mode control method of a vehicle according to another exemplary embodiment of the present disclosure. Referring to FIG. 14, a driving mode control apparatus 100 of the vehicle of FIG. 2 may be configured to change a driving mode of the vehicle as an eco-mode, a normal mode, a sport mode, or a custom mode. When the custom mode is selected by a request of a driver, in operation S210, the driving mode control apparatus 100 may be configured to execute the custom mode.

In particular, when the custom mode is executed, in operation S220, the driving mode control apparatus 100 may be configured to detect or identify the driver. In operation S230, the driving mode control apparatus 100 may be configured to set an initial value for each of driving control items or settings, for example, an acceleration characteristic, a shift quality characteristic, an EV characteristic, and/or a regen characteristic to a setting value previously stored in response to the identified driver.

Herein, the driving mode control apparatus 100 may be configured to identify the driver using a camera and/or one or more sensors. After the setting of the initial value of the custom mode is completed in operation S230, when no tuning request is received to tune a mode setting of the custom mode in operation S240, in operation S300, the driving mode control apparatus 100 may be configured to operate the vehicle based on the initial value set in operation S230. In particular, the driving mode control apparatus 100 may be configured to transmit driving control information that corresponds to the set initial value to a control system or the like of the vehicle.

Meanwhile, in response to receiving a tuning request to adjust the mode setting of the custom mode in operation S240, in operation S250, the driving mode control apparatus 100 may be configured to configure a mode setting screen and display the configured mode setting screen on a display. Even when no request is received for tuning the mode setting of the custom mode, when an initial setting is completed, the driving mode control apparatus 100 may be configured to configure a mode setting screen and display the configured mode setting screen on the display.

Further, when the input of the mode setting value is completed on the mode setting screen displayed on the display in operation S260, in operation S270, the driving mode control apparatus 100 may be configured to update a previously stored driver setting value to the mode setting value input in operation S260. In operation S280, the driving mode control apparatus 100 may be configured to tune the mode setting value of the custom mode. In operation S290, the driving mode control apparatus 100 may be configured to operate the vehicle based on the mode setting value tuned in operation S280. In particular, the driving mode control apparatus 100 may be configured to transmit driving control information that corresponds to the tuned mode setting value to the control system or the like of the vehicle.

Figure 15:
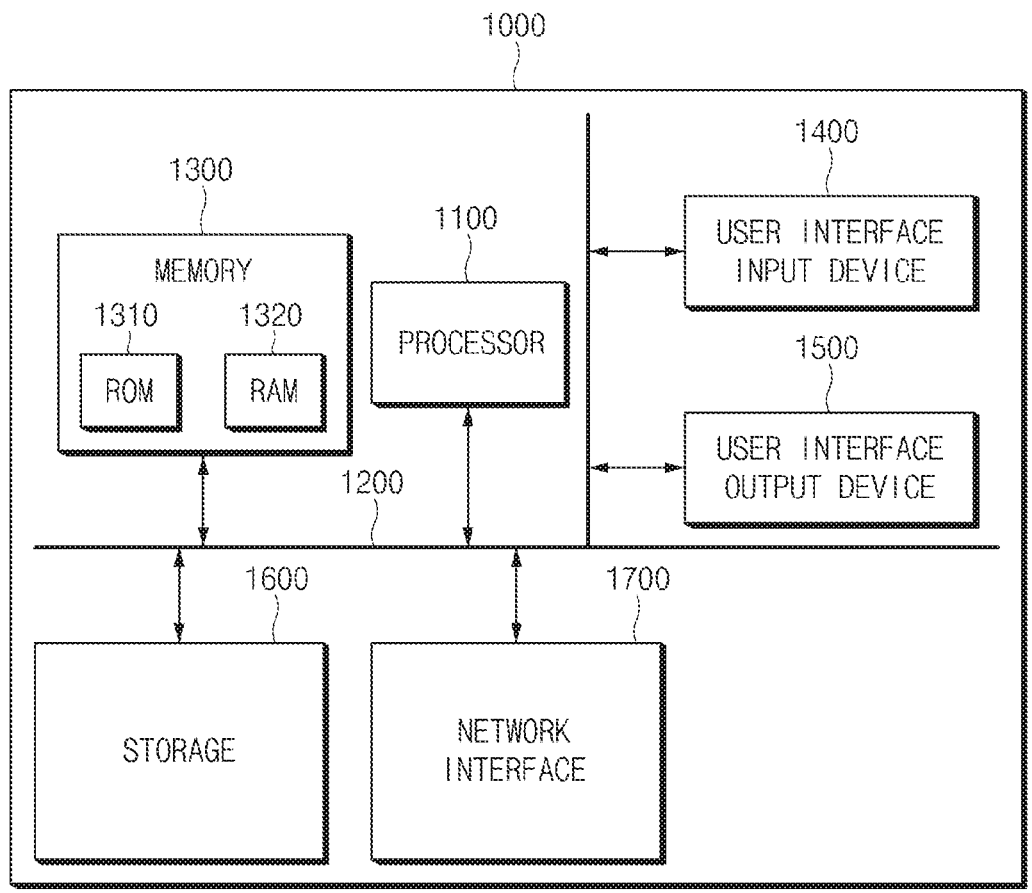
FIG. 15 is a block diagram illustrating a configuration of a computing system in which a method is executed, according to an exemplary embodiment of the present disclosure.

FIG. 15 is a block diagram illustrating a configuration of a computing system in which a method is executed, according to an exemplary embodiment of the present disclosure. Referring to FIG. 15, a computing system 1000 may include at least one processor 1100, a memory 1300, a user interface input device 1400, a user interface output device 1500, a storage 1600, and a network interface 1700, which are connected with each other via a bus 1200. The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM (1310)) and a random access memory (RAM (1320)).

Thus, the operations of the methods or algorithms described in connection with the exemplary embodiments disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside in a user terminal. Alternatively, the processor and storage medium may reside as a separate component of the user terminal.

According to an exemplary embodiment of the present disclosure, the driving mode control apparatus may be configured to increase driving satisfaction of a driver by implementing a mode in which a driving characteristic may be adjusted based on a driver request. Additionally, the driving mode control apparatus may allow a driver to more easily adjust a driving characteristic value on a mode setting screen including an adjustment bar that corresponds to each driving characteristic value.

While the present disclosure has been described with reference to exemplary embodiments, it will be apparent to those skilled in the art that various changes and modifications may be made without departing from the spirit and scope of the present disclosure. Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An apparatus for controlling a driving mode of a vehicle, comprising:
   a mode converter configured to convert the driving mode of the vehicle based on an operation of a mode conversion input;
   a screen configuration device configured to, when the driving mode is converted into a custom mode, configure a mode setting screen for adjusting a setting value of a driving characteristic preset and display the configured mode setting screen on a display of the vehicle; and
   a tuning device configured to tune a driving characteristic of the custom mode based on a setting value adjusted on the mode setting screen,
   wherein the driving mode includes an eco-mode, a normal mode, a sport mode, and the custom mode,
   wherein the mode setting screen includes adjustment bars for adjusting setting values that correspond to an acceleration characteristic or a shift quality characteristic and that correspond to one or more of an electric vehicle (EV) characteristic and a regenerative braking characteristic of the vehicle, and
   wherein the adjustment bar for adjusting the setting value that corresponds to the acceleration characteristic or the shift quality characteristic of the vehicle is adjusted to any one of an eco-item, a normal item, or a sport item, and wherein the tuning device is configured to:
      tune an initial value set in response to the acceleration characteristic or the shift quality characteristic of the vehicle to a driving characteristic value of the eco-mode, the normal mode, or the sport mode, the driving characteristic value being adjusted by the adjustment bar, wherein the adjustment bar for adjusting the setting value corresponding to the EV characteristic or the regenerative braking characteristic of the vehicle is adjusted to any one of stages 1 to 5, and wherein the tuning device is configured to:
  tune an initial value set in response to the EV characteristic or the regenerative braking characteristic of the vehicle to a driving characteristic value present in response to a stage adjusted by the adjustment along the stages 1 to 5, and
  tune the EV characteristic by adjusting one of an idle charging control state of charge (SOC) or a charging control SOC, or a charging control SOC based on the driving characteristic value present in response to the stage adjusted by the adjustment bar among the stages 1 to 5.

2. The apparatus of claim 1, wherein the mode converter is configured to:
  when converting the driving mode into the custom mode, set an initial value of the custom mode based on a predetermined default value.

3. The apparatus of claim 1, wherein the tuning device is configured to:
  tune the acceleration characteristic by adjusting one of an amount of launching torque, a torque variation tilt, and a shift pattern based on the driving characteristic value of the eco-mode, the normal mode, or the sport mode, the driving characteristic value being adjusted by the adjustment bar.

4. The apparatus of claim 1, wherein the tuning device is configured to:
  tune the shift quality characteristic by adjusting one of a shift time and shift quality based on the driving characteristic value of the eco-mode, the normal mode, or the sport mode, the driving characteristic value being adjusted by the adjustment bar.

5. The apparatus of claim 1, wherein the tuning device is configured to:
  tune a regenerative braking torque value based on the driving characteristic value preset in response to the stage adjusted by the adjustment bar among the stages 1 to 5.

6. An apparatus for controlling a driving mode of a vehicle, comprising:
  a mode converter configured to convert the driving mode of the vehicle based on an operation of a mode conversion button;
  a driver recognizing device configured to, when the driving mode is converted into a custom mode, recognize a driver within the vehicle;
  a screen configuration device configured to, when the driving mode is converted into the custom mode, configure a mode setting screen for adjusting a driver setting value of a driving characteristic preset in response to the recognized driver and display the configured mode setting screen on a display of the vehicle; and
  a tuning device configured to tune a driving characteristic of the custom mode based on a setting value adjusted on the mode setting screen,
  wherein the driving mode includes an eco-mode, a normal mode, a sport mode, and the custom mode, wherein the mode setting screen includes adjustment bars for adjusting setting values that correspond to an acceleration characteristic or a shift quality characteristic and that correspond to one or more of an electric vehicle (EV) characteristic and a regenerative braking characteristic of the vehicle, and wherein the adjustment bar for adjusting the setting value that corresponds to the acceleration characteristic or the shift quality characteristic of the vehicle is adjusted to any one of an eco-item, a normal item, or a sport item, and wherein the tuning device is configured to:
  tune an initial value set in response to the acceleration characteristic or the shift quality characteristic of the vehicle to a driving characteristic value of the eco-mode, the normal mode, or the sport mode, the driving characteristic value being adjusted by the adjustment bar, wherein the adjustment bar for ad Listing the setting value corresponds to the EV characteristic or the regenerative braking characteristic of the vehicle is adjusted to any one of stages 1 to 5, and wherein the tuning device is configured to:
  tune an initial value set in response to the EV characteristic or the regenerative braking characteristic of the vehicle to a driving characteristic value preset in response to a stage adjusted by the adjustment among the stages 1 to 5, and
  tune the EV characteristic by adjusting one of an idle charging control state of charge (SOC) or a charging control SOC or charging control SOC based on the driving characteristic value preset in response to the stage adjusted by the adjustment bar among the stages 1 to 5.

7. The apparatus of claim 6, wherein the mode converter is configured to:
  when converting the driving mode into the custom mode, access a setting value of the driving characteristic preset in response to the recognized driver and set an initial value of the custom mode based on the accessed setting value.

8. The apparatus of claim 6, further comprising:
  a storage configured to store the driver setting value of the driving characteristic preset in response to a driver selection,
  wherein the tuning device is configured to update the driver setting value stored in the storage, based on the tuned driving characteristic value.

9. A method for controlling a driving mode of a vehicle, comprising:
  converting, by a controller, the driving mode of the vehicle based on an operation of a mode conversion input;
  when the driving mode is converted into a custom mode, configuring, by the controller, a mode setting screen for adjusting a setting value of a driving characteristic preset and displaying the configured mode setting screen on a display of the vehicle; and
  tuning, by the controller, a driving characteristic of the custom mode based on a setting value adjusted on the mode setting screen,
  wherein the driving mode includes an eco-mode, a normal mode, a sport mode, and the custom mode,
  wherein the mode setting screen includes adjustment bars for adjusting setting values that correspond to an acceleration characteristic or a shift quality characteristic and that correspond to one or more of an electric vehicle (EV) characteristic and a regenerative braking characteristic of the vehicle, and wherein the adjustment bar for adjusting the setting value that corresponds to the acceleration characteristic or the shift quality characteristic of the vehicle is adjusted to any one of an eco-item, a normal item, or a sport item, and wherein the tuning, by the controller, of the driving characteristic of the custom mode includes tuning an initial value set in response to the acceleration characteristic or the shift quality characteristic of the vehicle to a driving characteristic value of the eco-mode, the normal mode, or the sport mode, the driving characteristic value being adjusted by the adjustment bar, wherein the adjustment bar for adjusting the setting value corresponding to the EV characteristic or the regenerative braking characteristic of the vehicle is adjusted to any one of stages 1 to 5, and wherein the tuning, by the controller, of the driving characteristic of the custom mode includes:

tuning an initial value set in response to the EV characteristic or the regenerative braking characteristic of the vehicle to a driving characteristic value present in response to a stage adjusted by the adjustment among the stages 1 to 5, and tuning the EV characteristic by adjusting one of an idle charging control state of charge (SOC) or a charging control SOC or a charging control SOC based on the driving characteristic value preset in response to the stag adjusted by the adjustment bar among the stages 1 to 5.

10. A method for controlling a driving mode of a vehicle, comprising:

converting, by a controller, the driving mode of the vehicle based on an operation of a mode conversion button;

when the driving mode is converted into a custom mode, recognizing, by the controller, a driver within the vehicle;

when the driving mode is converted into the custom mode, configuring, by the controller, a mode setting screen for adjusting a driver setting value of a driving characteristic preset in response to the recognized driver and displaying the configured mode setting screen on a display of the vehicle; and tuning, by the controller, a driving characteristic of the custom mode based on a setting value adjusted on the mode setting screen, wherein the driving mode includes an eco-mode, a normal mode, a sport mode, and the custom mode, wherein the mode setting screen includes adjustment bars for adjusting setting values that correspond to an acceleration characteristic or a shift quality characteristic and that correspond to one or more of an electric vehicle (EV) characteristic and a regenerative braking characteristic of the vehicle, and wherein the adjustment bar for adjusting the setting value that corresponds to the acceleration characteristic or the shift quality characteristic of the vehicle is adjusted to any one of an eco-item, a normal item, or a sport item, and wherein the tuning, by the controller, of the driving characteristic of the custom mode includes tuning an initial value set in response to the acceleration characteristic or the shift quality characteristic of the vehicle to a driving characteristic value of the eco-mode, the normal mode, or the sport mode, the driving characteristic value being adjusted by the adjustment bar, wherein the adjustment bar for adjusting the setting value corresponding to the EV characteristic or the regenerative braking characteristic of the vehicle is adjusted to any one of stages 1 to 5, and wherein the tuning, by the controller, of the driving characteristic of the custom mode includes:

tuning an initial value set in response to the EV characteristic or the regenerative braking characteristic of the vehicle to a driving characteristic value preset in response to a stage adjusted by the adjustment among the stages 1 to 5, and tuning the EV characteristic by adjusting one of an idle charging control state of charge (SOC) or a charging control SOC based the driving characteristic value preset in response to the stage adjusted by the adjustment bar among the stages 1 to 5.

11. The method of claim 10, further comprising:

before converting the driving mode, storing, by the controller, the driver setting value of the driving characteristic preset in response to a driver selection.

12. The method of claim 11, further comprising:

updating, by the controller, the stored driver setting value based on the tuned driving characteristic value.

* * * * *